United States Patent [19] [11] Patent Number: 4,774,528
Kato [45] Date of Patent: Sep. 27, 1988

[54] THERMAL RECORDING APPARATUS CAPABLE OF GRADATION RECORDING

[75] Inventor: Nobuhisa Kato, Kanagawa, Japan

[73] Assignee: Fuji Xerox Co., Ltd., Tokyo, Japan

[21] Appl. No.: 43,923

[22] Filed: Apr. 29, 1987

[30] Foreign Application Priority Data

Apr. 30, 1986 [JP] Japan .................................. 61-98251

[51] Int. Cl.⁴ ............................................ G01D 15/10
[52] U.S. Cl. ............................... 346/76 PH; 400/120; 364/519; 358/298
[58] Field of Search ................. 346/76 PH, 76 R, 1.1; 219/216, 216 PH; 400/120, 120 PH; 250/317.1, 318; 364/519; 358/298, 256

[56] References Cited

U.S. PATENT DOCUMENTS 4,399,749 8/1983 Arai ................................. 346/76 PH
4,443,121 4/1984 Arai ..................................... 358/256
4,590,487 5/1986 Noguchi et al. ............. 219/216 PH

FOREIGN PATENT DOCUMENTS

0078265 5/1982 Japan .................................... 358/256
0117772 7/1983 Japan .............................. 346/76 PH
0076363 4/1985 Japan .............................. 346/76 PH
0168669 9/1985 Japan .................................... 400/120

Primary Examiner—E. A. Goldberg
Assistant Examiner—Huan H. Tran
Attorney, Agent, or Firm—Finnegan, Henderson, Farabow, Garrett and Dunner

[57] ABSTRACT

A thermal recording apparatus includes a comparator for comparing the black density of picture elements to be recorded by thermal recording elements to reference density levels, a counter accumulates a value representing the number of picture elements having density levels in certain ranges as a result of the comparison by the comparator. The counter value is used to adjust the pulse width of pulses used to energize the recording elements to compensate for fluctuations in the levels of the pulses due to the number of recording elements that are energized at one time and the durations of the energizations in order to record visible images of the picture elements with appropriate densities.

4 Claims, 7 Drawing Sheets

THERMAL RECORDING APPARATUS CAPABLE OF GRADATION RECORDING

FIELD OF THE INVENTION

The present invention relates to an apparatus for thermal recording by means of a recording head such as a thermal head and, more particularly, to a thermal recording apparatus capable of obtaining good medium contrast recording by correcting variations in recording density resulting from fluctuations in the number of heating elements being supplied with power at any given time.

Application Ser. No. 07/044,002, filed on 04/29/1987 by the present inventor and entitled "Thermal Printing Device" is hereby incorporated by reference.

BACKGROUND OF THE INVENTION

An apparatus for thermal recording by means of thermosensitive paper and a transfer type thermosensitive recording media is commonly used in facsimiles and printers. In such a recording apparatus, a thermal head having heating elements arranged in a row is used as a recording head. However, the thermal head produces thermal energy during recording, and a problem results in that image quality may be deteriorated because of variations in the thermal energy. A primary reason for such image deterioration is voltage drop attributable to the so-called "black ratio".

The term "black ratio" refers to the ratio of the total number of heating elements in the thermal head being supplied with power at one time to the total number of heating elements in the terminal head. In the case of black-white recording, the percentage of black printing dots is determinative while, in the case of multicolor recording, the percentage of printing dots in each recording color is determinative.

As the black ratio fluctuates, voltage changes in the power supply itself or increased current flowing through the power supply line may cause a voltage drop. Accordingly, unless compensation is made therefor, the greater the black ratio becomes, the less the calorific value becomes of each heating element per unit time. In other words, the recording density is reduced proportionally and the desired gradation in contrast and/or color cannot be obtained. Where it is necessary to reproduce a delicate color using a plurality of recording colors, if the black ratio in the same recording portion differs for the various recording colors the desired recording density and the color balance may be adversely affected and the recorded image may be degraded.

OBJECTS AND SUMMARY OF THE INVENTION

An object of the present invention is to provide a thermal recording apparatus capable of gradation recording.

Another object of the present invention is a thermal recording apparatus capable of compensating for black ratio fluctuation to produce stable gradation realization.

The present invention is applicable to a thermosensitive recording process capable of controlling the calorific value of each of a plurality of heating elements constituting a printing head by setting the time during which power is supplied to the heating elements in a multistage manner and thereby providing the multistage expression of gradation by picture elements each corresponding to the heating elements. The thermal recording apparatus for implementing the aforesaid process comprises image data storage means for storing, as a recording unit, image data equivalent to picture elements, gradation level comparison means for comparing the gradation level representing each of the picture elements constituting one recording unit of picture data with a reference gradation level, counting means for counting the number of picture elements whose level exceeds the aforesaid reference gradation level based on the comparison results obtained from the gradation level comparison means, and gradation level correcting means for correcting the gradation level expressed by the image data stored in the aforesaid image data storage means in accordance with the results counted by the counting means.

By correcting the gradation level corresponding to the results counted by the counting means, potential errors in the realization of gradation resulting from the voltage drop can be avoided. In the gradation level comparison means, the reference gradation level may be adjustable. By varying the gradation level in the gradation level correcting means based on the results counted by the counting means and the temperature data representing the base temperature in the printing head, more accurate gradation correction becomes possible. The gradation level correcting means may be provided with the correction data of gradation conversion mating the gradation level expressed by the image data with the printing side or a gamma correction means for modifying the number of gradation expressed by the image data to a number compatible with the printing elements.

BRIEF DESCRIPTION OF THE DRAWINGS

The manner by which the above objects and other objects feature and advantages of the present invention are attained will become fully apparent upon reference to the following detailed description and the accompanying drawings wherein.

DETAILED DESCRIPTION OF THE INVENTION

An embodiment of the present invention will now be described in detail with reference to the foregoing drawings. Throughout the drawings, like reference characters are used to designate like elements.

Figure 1:
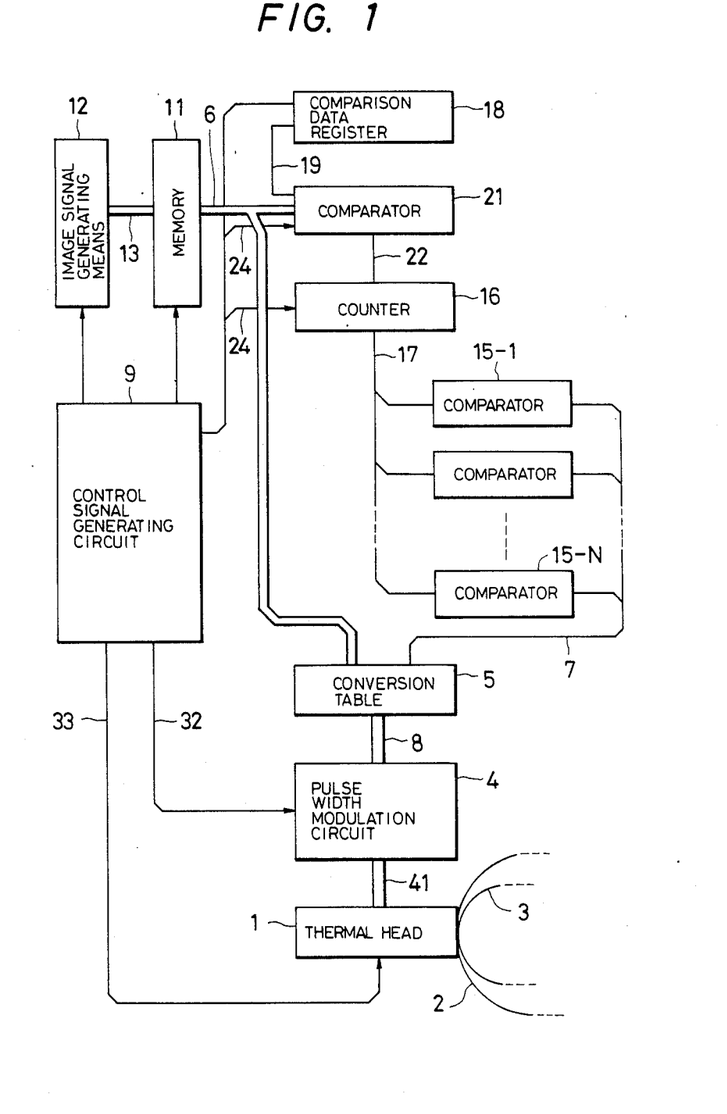
FIG. 1 is a block diagram showing the principal parts of a thermal recording apparatus according to the present invention.

FIG. 1 is a block diagram showing the principal parts of a thermal recording apparatus embodying the present invention. A thermal head 1 used in the aforesaid thermal recording apparatus is formed of a thick film type heating unit built on a base (not shown). A number of comb-like lead electrodes (not shown) connected to the heating unit are properly selected and the heating elements divided on a lead electrode basis are selectively supplied with power, whereby heating control is established.

In this thermal recording apparatus, a thermal sublimating ink donor film (i.e., thermal recording medium) 2 is made to slidably contact the thermal head 1, and ink is consequently transferred to recording paper (e.g., ordinary paper) 3 superposed on film 2 to provide image data. The expression of multistage gradation by picture elements is made possible by continuously changing the quantity of ink transferred from the thermal sublimating ink donor film 2 depending on the energy applied to the heating elements. In the described embodiment, the energy is controlled on a heating element basis by modulating the duration (pulse width) of the pulses applied to each heating element. A pulse width modulation circuit 4 is provided for this purpose.

A conversion table 5 arranged in the stage preceding the pulse width modulation circuit 4 is designed to correct the gradation of each item of image data supplied to the thermal recording apparatus on (i) the picture element basis or (ii) depending on the black ratio. The conversion table 5 includes a ROM (Read Only Memory) and, according to address data which is the combination of high order address data 6 and low order address data 7, outputs an image signal 8 with the corrected gradation.

The high order address data 6 is the image signal read out of a memory 11 under the control of read pulses provided by a control signal generating circuit 9. The memory 11 is formed with a RAM (Random Access Memory) for storing an image signal 13 read from an image signal generating means 12 which generates the value of the data that are to be written by the thermal head 1.

On the other hand, the low order address data 7 consists of N bits of parallel data as comparison outputs of a plurality of comparators 15-1 through 15-N. Comparators 15-1 through 15-N are supplied with black ratio comparison data 17 representing the number of actuated printing dots counted by a counter 16. The comparison value 19 set by a comparison data register 18 is compared with the image signal 6 outputted from the memory 11 using a comparator 21, the counter 16 counts the number of gradation within a picture element that exceed comparison value 19 in reference to the comparison result 22.

In other words, the comparator 21 compares the gradation levels of picture elements using the comparison value 19 with reference to the image signal 6 per recording unit. A comparison result 22 is produced with a high level for each picture element having gradation level exceeding the threshold value. In synchronism with the clock signal 24 supplied by the control signal generating circuit 9, the counter 16 counts high level comparison results 22 of picture elements each produced by the comparator 21. Accordingly, the black ratio comparison data 17 is considered equivalent to the total number of picture elements exceeding the aforesaid threshold value in the image signal 6 per recording unit.

Of the comparators 15-1 through 15-N, the first comparator 15-1 performs the black ratio comparison data 17 to determine whether the number of black picture elements is equivalent to, e.g., 25% of the total picture elements in a recording unit. If the comparison result is that the black ratio is below 25% of the number of picture elements, the least significant bit (LSB) of the N bit low order address data 7 is set at "1." In all other cases, the LSB is set at "0." The second comparator 15-2 compares the black ratio comparison data 17 with the number of picture elements to determine if, 25% and 50% of the total picture elements per recording unit are black. If the black ratio is determined in a range between 25% and 50% of the picture elements, the second bit of the low order address data 7 is set at "1." In other cases, the second bit is set at "0." In the same manner, the comparison results of the N comparators are produced as the N bit low order address data 7.

In the present embodiment, it is assumed for explanatory purposes that N is 3 and that three comparators 15-1 through 15-3 are used. The first comparator 15-1 compares the black ratio with the total number of picture elements to see whether the former is less than 25% of the latter and the second comparator 15-2 makes the comparison in the same manner to see whether the former is more than 25% but less than 50% of the latter and further the third comparator makes the comparison in the same manner to see whether the former is more than 50% of the latter.

Figure 2:
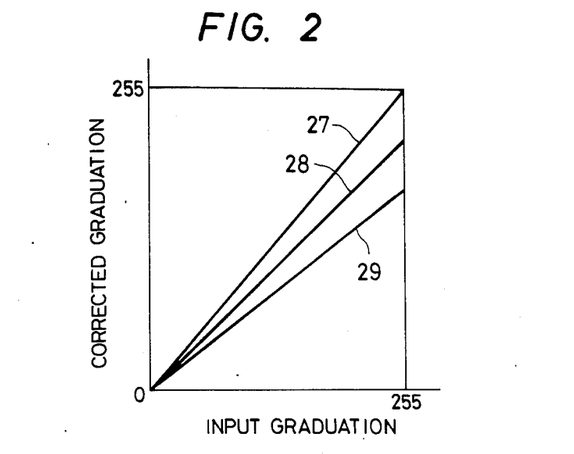
FIG. 2 is a graph showing the contents of a conversion table for the block diagram of FIG. 1.

FIG. 2 shows the contents of the conversion table 5 in the above case. In FIG. 2, the abscissa axis represents the input gradation of the image signal 6, e.g., gradation in 256 stages, whereas the ordinate axis expresses the image signal 8 with corrected graduation, e.g., gradation in 256 stages. In FIG. 2, the three continuous lines indicate the contents of the low order address data 7, the lines 27, 28 and 29 designate the black ratio more than 50%, between 25% and 50%, and less than 25%, respectively. That is, as the black ratio increases, the input gradation level is increased to produce a corrected gradation in order to compensate for the voltage drop caused thereby.

Figure 3:
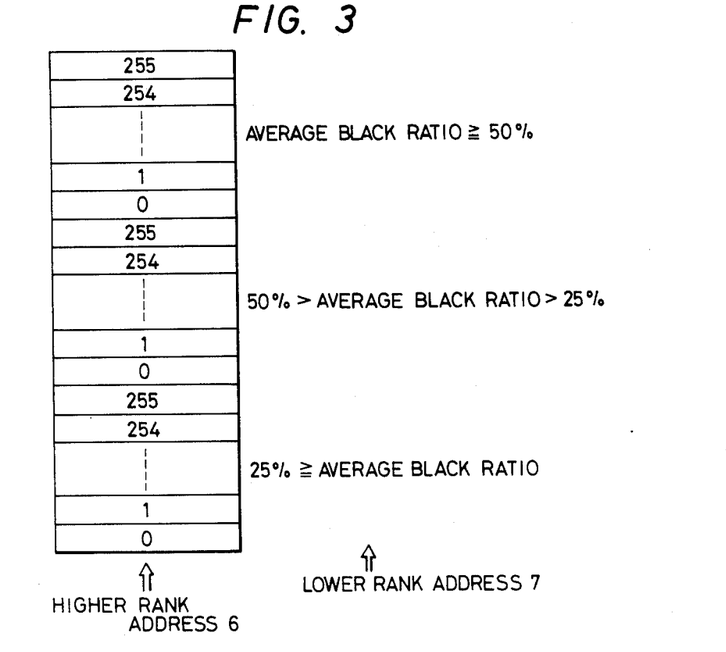
FIG. 3 is a structural diagram of the conversion table of FIG. 2.

FIG. 3 shows the components of the conversion table. The conversion table 5 is employed to retrieve the image signal with the gradation compensated by the high order address data 6 and the low order address data 7 in three stages. The image signal 8 produced by the conversion table 5 is supplied to the pulse width modulation circuit 4 and is converted into a signal that has a pulse width corresponding to the gradation. To be concrete, a plurality of unit pulses constitute the applied pulse equivalent to one raster and each gradation level is expressed by adjusting the number of unit pulse applied to each heating element to in effect apply a variable pulse width signal. The setting up of the density corresponding to the average black ratio can be carried out by adjusting the voltage of the pulse to be applied to the thermal head 1.

Figure 4:
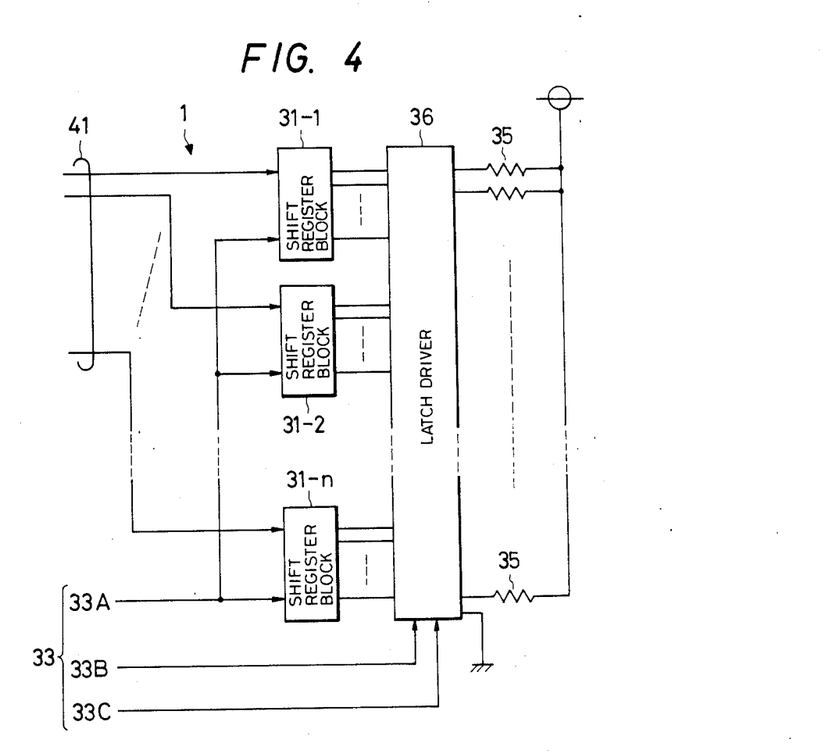
FIG. 4 is a circuit diagram showing a construction of a thermal head for use with the recording apparatus of FIG. 1.
Figure 5:
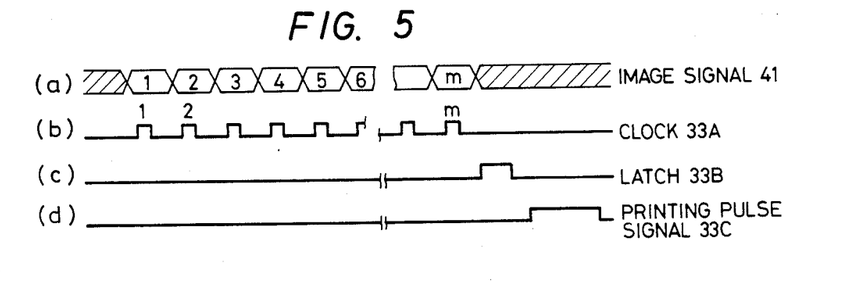
FIG. 5 is a timing chart showing the operation of the thermal head of FIG. 4.

FIG. 4 shows an example of the thermal head arrangement capable of implementing the aforesaid control and FIG. 5 shows the operation of the thermal head. As shown in FIG. 4, there are arranged n shift register blocks 31-1 through 31-n systematically provided in the thermal head 1, so that the selected data binary image signal 41 is systematically supplied by the pulse width modulation circuit 4 shown in FIG. 1 to each of them. A control signal 32 is supplied to the pulse width modulation circuit 4 to synchronize the image signal. A clock signal 33A (FIG. 5b) is similarly supplied by the control signal generating circuit 9 to each of the shift register blocks 31-1 through 31-n and the binary image signal 41 (FIG. 5a) is supplied synchronously with the clock signal 33A bit by bit. When the number of data obtained only by dividing the total number m×n of heating elements 35 of the thermal head 1 by the system number n is set in each of the shift register blocks 31-1 through 31-n, it is subjected to serial-parallel conversion and then supplied to a latch driver 36. The number "m" is the number of bits of each shift register and the number "N" indicates the number of data lines for supplying the data 41. The number, N, of data lines does not successively correspond to the number of shift registers. For example, if a thermal head is capable of printing 2,048 data per raster, if N is 16, each shift register must have a capacity of 128 bits.

The latch driver 36 latches the data by means of a latch signal 33B (FIG. 5c) supplied by the control signal generating circuit 9 and controls the supply of power to each heating element 35 with the time width determined by the printing pulse signal (FIG. 5d). That is, the heating element 35 is energized for a predetermined time width with respect to the portion only wherein the image signal 21 remains in the status "11," whereby the electric energy is converted into thermal energy.

One pulse of thermal energy is thus applied and the data in the latch driver 36 is successively replaced with other data for a maximum of 256 times and the same operation is repeated, so that recording operation equivalent to one raster is carried out.

In the thermal head 1, each heating element 35 is supplied with a selected number of pulses having a corresponding cumulative pulse width corresponding to the gradation to be printed. Assuming that the heating element slidably contact the base layer side of the ink donor film (thermal recording medium) whose surface is coated with thermal sublimating ink and that the cumulative direction of the number of pulses that are applied at, for examples, at an interval of 3 mS or 5 mS changes, a quantity of ink proportional to the cumulative thermal energy will be transferred to the recording paper superposed on the ink donor film. The expression of gradation on a dot basis is thereby realized.

When a different kind of thermal recording medium with a different recording system is used, the finish of a recorded image will be slightly different even though the thermal head 1 is driven identically. Therefore, the image signal 13 representing the gradation may be precorrected by a device installed in the preceding stage of the thermal recording apparatus or otherwise independently corrected by the conversion table 5. The conversion table 5 is also used to adjust the difference between the number of input gradations and that of output ones.

Figure 9:
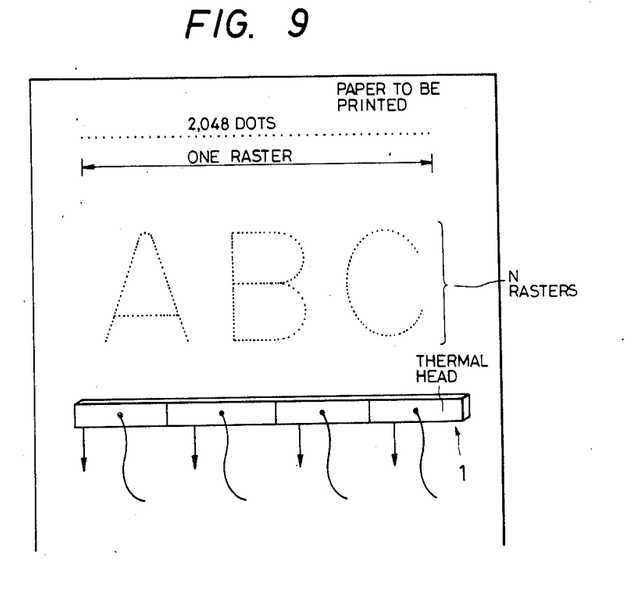
FIG. 9 is a perspective view showing a thermal head and a printed paper.

The thermal recording apparatus described above may be used as a line printer. In such case, the length of one raster is in proportion to the width of the paper to be printed as shown in FIG. 9. A thermal head 1 prints a plurality of unit dots corresponding to the picture elements of one raster. For example, the thermal head 1 may print a line of 2,048 dots as a single raster. Each dot corresponds to a picture element and, therefore, may be represented by 8 bits.

Figure 10:
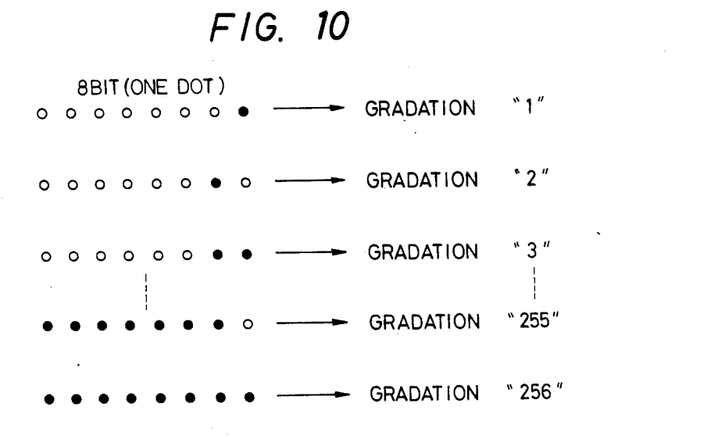
FIG. 10 is a view showing a relationship between an image signal having 8 bit and its unique gradation.

The image signal generating means 12 receives signals from a scanner or other interface (not shown in FIG. 1) and generates a raster of picture elements wherein each picture element is represented by an 8 bit value indicating the image density (gradation) of the picture element. Each picture element can indicate one of 256 gradations as shown in FIG. 10.

The RAM 11 outputs an image signal 6, that is 8 bits for each of 2,048 dots, to a comparator 21. The comparator compares the gradation value of each picture element or dot (8 bits) with a comparison data 19 derived from a comparison data register 18. A counter 16 counts the number of picture elements in a raster exceeding the comparison data 19 that comprises a reference black ratio. Therefore, in the apparatus according to the present invention, the term "black ratio" refers to the ratio of the total number of dots or picture elements in one raster (e.g., 2,048) to the number of dots or picture elements in the raster having a gradation that exceeds the comparison data 19. Dots or picture elements having gradation levels that are below the comparison data are assumed to not adversely influence the voltage drop to the heating elements. The value of the comparison data 19 may be selected and stored in the register 18.

Figure 11:
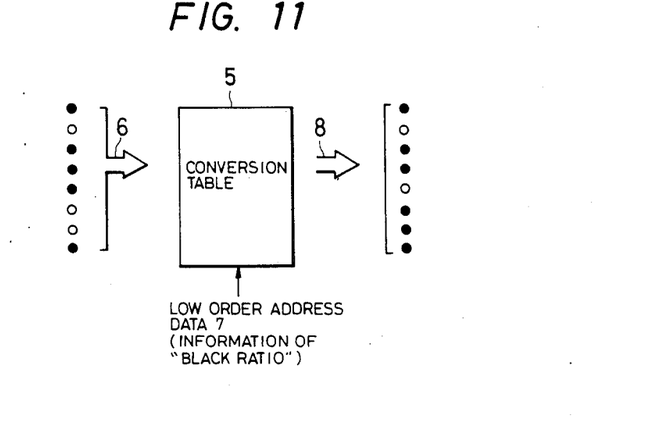
FIG. 11 is a view showing an input signal and an output signal of the conversion table.
Figure 12:
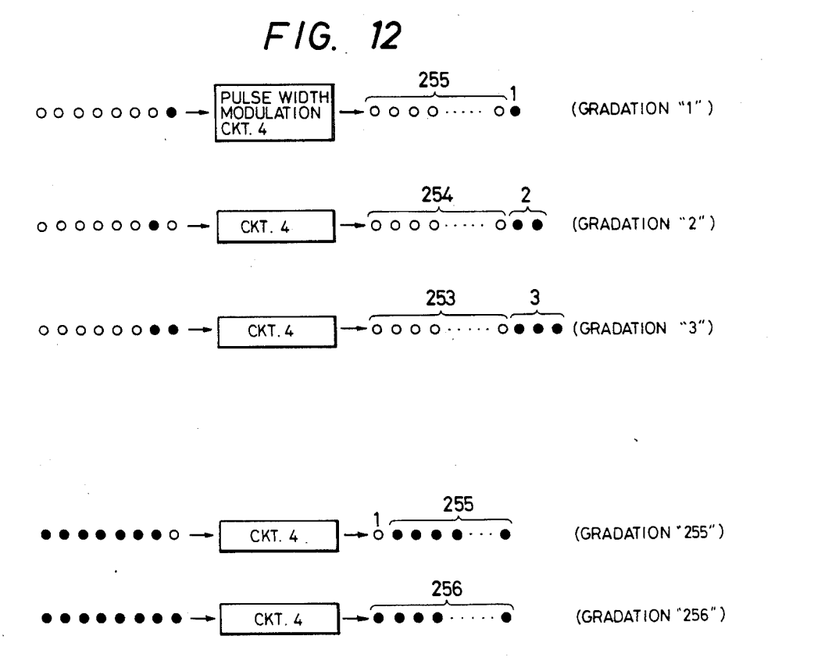
FIG. 12 is a view showing input and output signals of the pulse width modulation circuit.

The image signals 6 (gradation data) for one dot are inputted in parallel into the conversion table 5 wherein each of signals, i.e., one dot or picture element of 8 bits, is converted in accordance with the range of the black ratio, as shown in FIG. 11. The conversion table 5 outputs the converted signal in parallel to the pulse width modulation circuit 4. The pulse width modulation circuit 4 modulates a pulse width of each of the signals indicating compensated gradation, as shown in FIG. 12.

Figure 13:
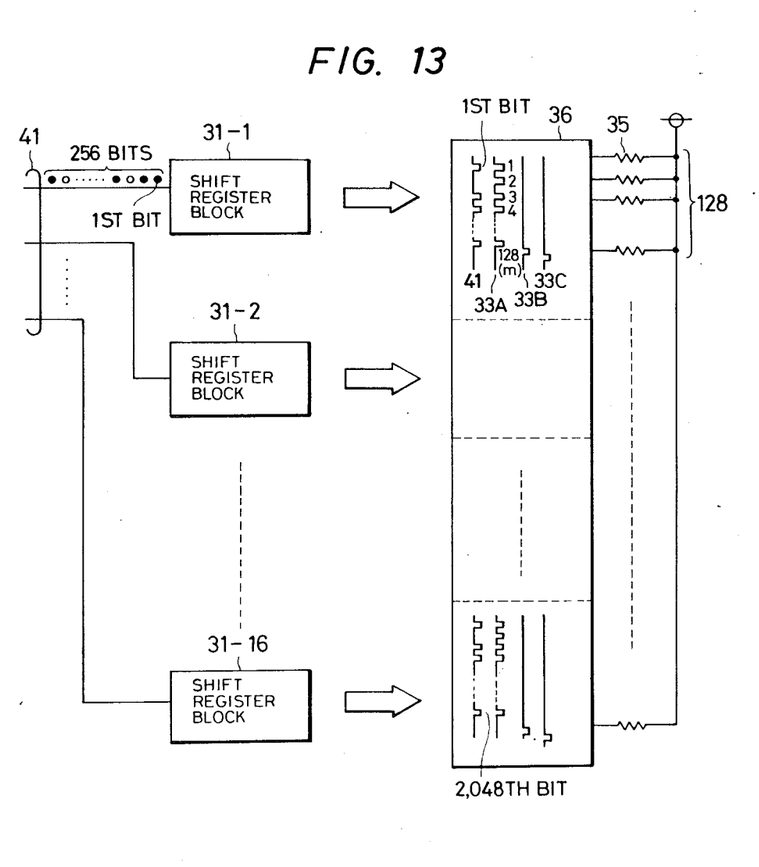
FIG. 13 is a view showing signal pulses in the thermal head.

A data flowing through the thermal head 1 is illustrated in FIG. 13. The data in the latch driver 36 is successively replaced with other data for 256 times so as to carry out the printing operation equivalent to one raster. As used herein, pulse width modification means that to increase the density of a recorded dot, a large number of voltage pulses must be applied to a corresponding heating element. Thus, the sum of the width of the pulses will vary according to variations in the number of pulses.

In FIG. 5, "m" is the number of the bits for one shift register block and will have the value of 128 in case that 16 shift registers blocks, are provided for printing one raster as clearly shown in FIG. 13 (16×128=2,048). One shift register block generally comprises a plurality of shift registers.

Figure 6:
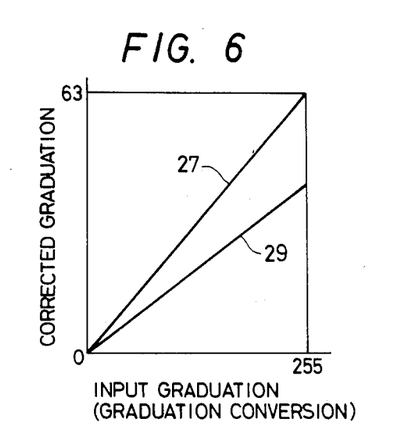
FIG. 6 is a graph showing a conversion table for use in the conversion of gradation.

FIG. 6 is a graph showing 256 difference input gradations in 256 fully expressed by input gradation data of 8 bits per picture element gradation conversion produces an output having 64 gradation and the input and output gradations are linearly related. In this case, a single level gradation change occurs on the output side whenever a change of four gradations occurs on the input side. The continuous lines 27, 29 in FIG. 2 are shown for reference. The following FIGS. 7 and 8 are graphs showing a gradation in the same manner.

Figure 7:
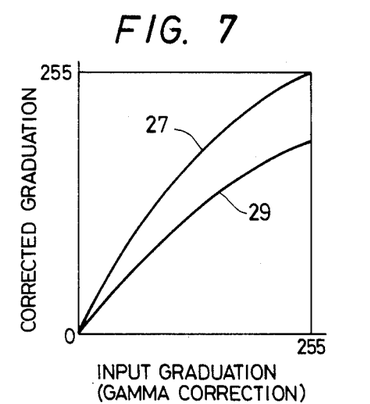
FIG. 7 is a graph showing a conversion table for use in gamma correction.

FIG. 7 shows an example of gamma correction of a gradation. In this example, the gradation is non-linearly corrected to compensate for the properties of the thermal recording medium. The correction curve expressed by the continuous line 27 is determined according to the properties of the thermal recording medium.

Figure 8:
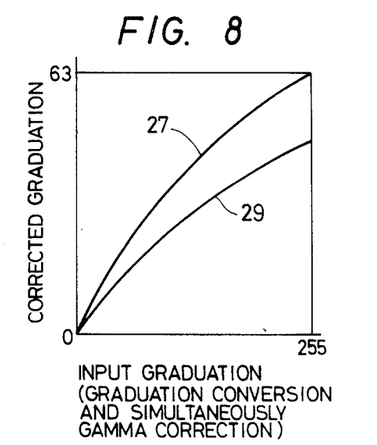
FIG. 8 is a graph showing a conversion table for use both in gamma correction and the conversion of gradation.

On the other hand, FIG. 8 shows an example wherein the conversion table 5 is used to carry out simultaneously gradation conversion and gamma correction. In this example, the gamma correction shown in FIG. 7 is made during the process of gradation conversion from 256 to 64 stages.

The conversion table 5 is usable not only for correcting for variation in the thermal properties of the heating elements, but also for adjusting the number of gradation stages and adjusting the expression of gradation to what is desired. The conversion table 5 may be formed with a ROMi or a RAM in such a manner that its contents can be altered by the user. Needless to say, a plurality of conversion table 5 may be provided and selected among to the satisfaction of the user or the characteristics of the image data.

Although a description of the thermal recording apparatus using the thermal sublimating ink donor film has been given, the present invention is applicable to a thermal recording apparatus employing thermal color development paper and all other kinds of thermal recording devices capable of reproducing neutral tints. Although the correction of gradation relative to the fluctuation of the black ratio has been described in the above embodiment, the correction of gradation depending on the temperature of the base and the further accurate expression of gradation can be made by providing the thermal head 1 with a means for detecting the temperature of the base or computing the temperature of the base from the gradation levels of the image signal.

The gradation level correcting means, such as the conversion table, is prepared and the gradation is corrected by means of the fluctuation of the black ratio according to the present invention, whereby the expression of gradation can freely be changed by changing the contents of the gradation level correcting means. The further advantage is that the aforesaid alteration is simply made by the replacement of the ROM or by the use of a changeover switch.

What is claimed:

1. A thermal recording apparatus adapted to perform a thermosensitive recording process capable of controlling the calorific value of each of a plurality of heating elements constituting a printing head by setting the time during which power is supplied to the heating elements in a multistage manner and thereby providing the multistage expression of gradation by picture elements each corresponding to the heating elements, a thermal recording apparatus for implementing the aforesaid process comprising:
   (1) image data storage means for storing image data as a recording unit comprising a plurality of picture elements;
   (2) gradation level comparison means for comparing the gradation level representing each of the picture elements constituting one recording unit of picture data with a reference gradation level;
   (3) counting means for counting the number of picture elements whose gradation level exceeds the aforesaid reference gradation level based on the comparison means; and
   (4) gradation level correcting means for correcting the gradation level expressed by the image data stored in the aforesaid image data storage means in accordance with the results counted by the counting means representing the cumulative gradations of the picture elements.

2. A thermal recording apparatus as claimed in claim 1, wherein the reference gradation level in the gradation level comparison means is adjustable and wherein the gradation level correcting means corrects the gradation level from the results counted by the counting means.

3. A thermal recording apparatus as claimed in claim 1, wherein the gradation level correcting means is provided with gradation conversion correcting data for correcting the gradation level expressed by the image data to the level on the printing side when the number of gradations represented by the image data differs from what is expressed by each picture element.

4. A thermal recording apparatus as claimed in claim 1, wherein the gradation level correcting means is provided with gamma correcting data for correcting the gradation represented by the image data according to the properties of the thermal recording medium.

* * * * *